June 19, 1934.    N. B. HALL    1,963,899
AERONAUTIC INSTRUMENT
Filed June 30, 1933    2 Sheets-Sheet 1

Inventor
NORMAN B. HALL
By Mason Fenwick & Lawrence
Attorneys

June 19, 1934.   N. B. HALL   1,963,899
AERONAUTIC INSTRUMENT
Filed June 30, 1933   2 Sheets-Sheet 2
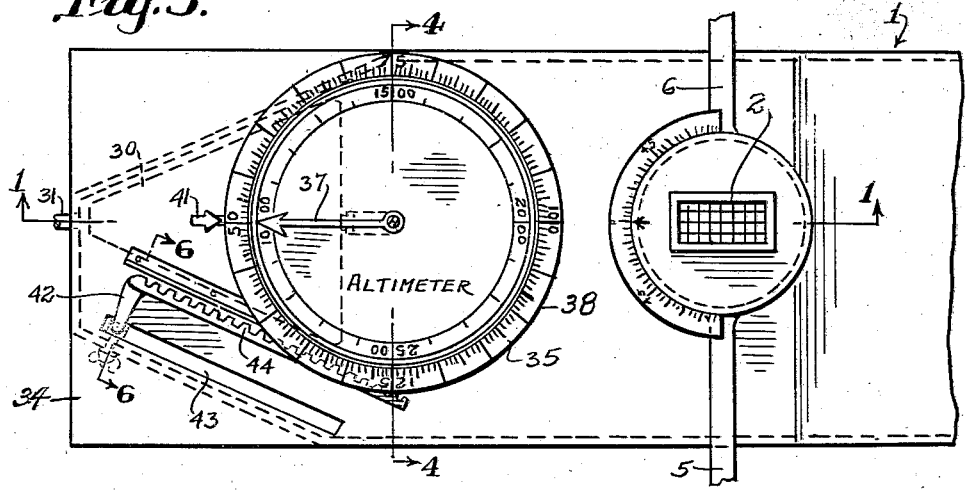
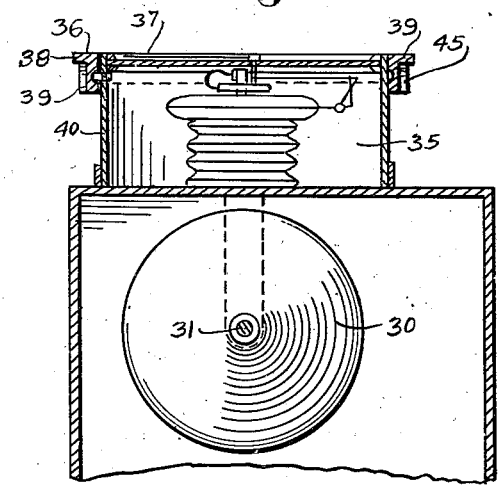
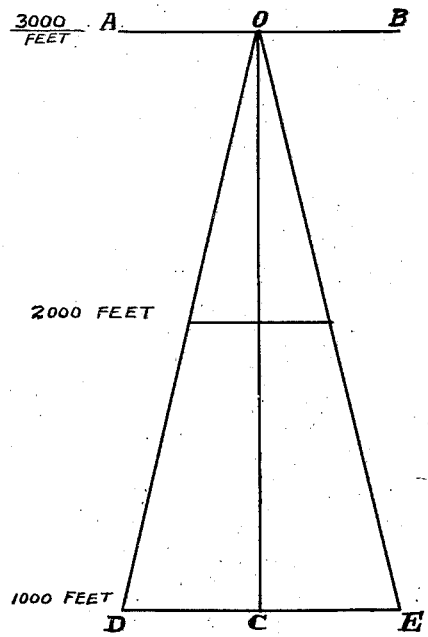
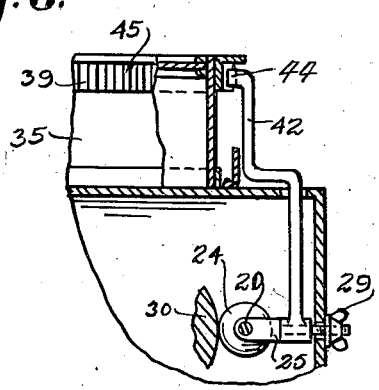
Inventor
NORMAN B. HALL Patented June 19, 1934

1,963,899

UNITED STATES PATENT OFFICE 1,963,899

AERONAUTIC INSTRUMENT

Norman B. Hall, Chevy Chase, Md.

Application June 30, 1933, Serial No. 678,499

5 Claims. (Cl. 33—46.5)

The invention forming the subject matter of this application is a direct reading ground speed indicator, adapted for use on aircraft. Preferably, the invention includes, as one of its elements, the ground speed measuring device disclosed in my United States Patent No. 1,307,629, June 24, 1919.

The main object of the invention is to provide a measuring device by means of which the drift, altitude, and ground speed of an aircraft may be simultaneously determined and indicated without the necessity of referring to previously prepared tables or charts.

Other objects of the invention will become apparent as the detailed description thereof proceeds.

In the drawings:

Figure 3 is a fragmentary top plan view, to an enlarged scale, of the combined altimeter and ground speed indicator part of the invention;

Figure 4 is a fragmentary side elevation of the apparatus shown in Figure 3; and Figure 5 is a diagram illustrating the principle of the invention.

Figure 6 is a detail section through the speed-changing mechanism.

Figure 1:
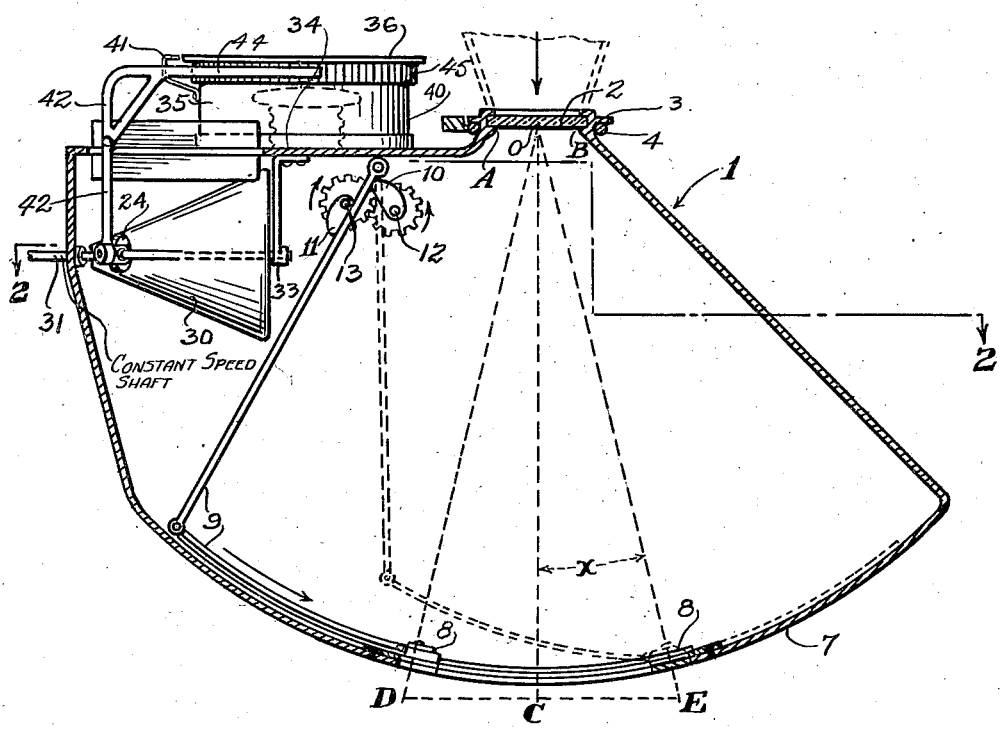
Figure 1 is a side view of the invention, partly in longitudinal vertical section, and partly in elevation.

As shown in the drawings, the invention comprises a casing 1 having an image receiving ground glass plate 2, suitably secured in an annular boss 3 rotatably mounted in a ring 4. The ring 4 is connected to oppositely extending arms 5 and 6, the ends of which are adapted to be suitably secured to some fixed part of the aircraft on which the instrument is to be mounted. In other words, the ring 4 with the arms 5 and 6 constitute a supporting bracket on which the instrument as a whole is designed to be rotatably mounted. It will be understood, of course, that the arms 5 and 6, whether secured to standards, or to any other fixed part of the aircraft, shall be so mounted that the ring 4 will be normally horizontal or substantially so during the flight of the aircraft.

The bottom 7 of the casing is formed as a segment of a cylinder having its axis at the center of the image receiving plate 2. The said bottom 7 is provided with a series of slots in which are slidably mounted the lenses 8 for projecting the image of the terrain below the aircraft onto the plate 2, as fully described in the aforesaid Patent No. 1,307,629. These lenses are reciprocated in their slots by means of linkages 9 operated through cams 10 and 11 suitably secured to shafts 12 and 13, respectively, journaled parallel to each other in the opposite side walls 14 and 15 of the casing 1.

Figure 2:
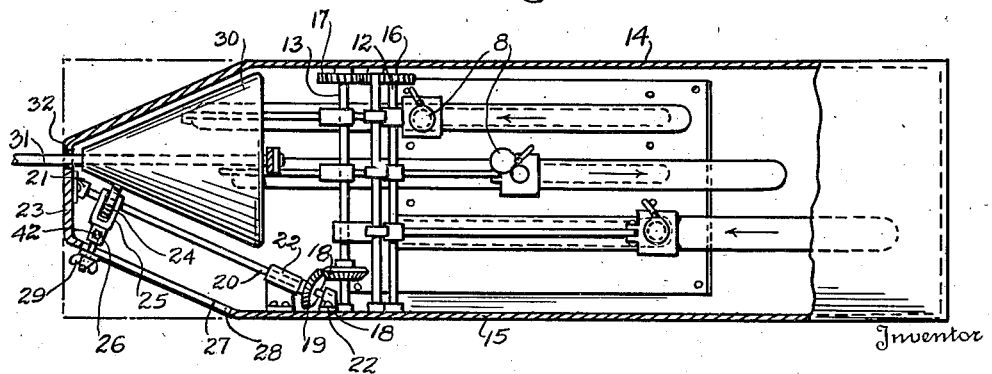
Figure 2 is a horizontal section taken on the line 2—2 of Figure 1.

The shaft 12 is provided at one end with a spur gear 16 meshing with a spur gear 17 fixed to the shaft 13. A bevel gear 18 near the other end of the shaft 13 meshes with a bevel gear 19 fixed to a shaft 20 which is journaled at its opposite ends in the bearings 21 and 22, mounted on the end wall 23 of the casing and the side wall 15 thereof, as shown in Figure 2. The shaft 20 is preferably square in cross section to receive slidably, but non-rotatably, a friction pinion 24. The pinion 24 is adapted to be moved lengthwise of the shaft 20 by means of a yoke 25 extending from a rod 26 which projects through a slot 27 formed in the inclined wall 28 connecting the end wall 23 to the side wall 15 of the casing.

The rod 26 is preferably screwthreaded at its outer end to receive a butterfly nut 29 adapted to secure the yoke 25 in any desired position lengthwise of the slot 27. It will be understood, of course, that the arms of the yoke are slidably and rotatably connected to the shaft 20 on opposite sides of pinion 24 to effect the sliding movement of the friction pinion 24 and also to permit the locking of the yoke 25 along the slot 27. The pinion 24 is in frictional engagement with a friction cone 30 suitably fixed to a drive shaft 31 mounted to rotate in a journal bearing 32 and in the lower end of a bracket 33 suitably secured to the top 34 of the casing 1. There is nothing novel in the part so far described, because this has been shown in my Patent No. 1,307,629. The improvement begins at this point.

The top wall 34 of the casing 1 has fixed thereon a sensitive altimeter 35, preferably in some position convenient to the observer near the image receiving plate 2. This altimeter so far as its operating details is concerned is in common use on aircraft and does not form a part of the present invention; but, it must be sensitive. The invention, however, is concerned with the particular arrangement of scale on the dial 36, because this arrangement of scale and the movements of the needle of the altimeter pointer 37 cooperate with a ground speed indicator plate 38 to indicate automatically, at various altitudes, the ground speed of the aircraft without the necessity of the aeronaut having to resort to complicated tables for this purpose.

The ground speed indicator plate 38 is formed as a flange on the upper part of the gear ring 39 which is suitably secured to rotate about the cylindrical casing 40 of the altimeter 35. This ring is preferably mounted so that the plate 38 is flush with the top of the casing 40 and in such position that the pointer 37 of the altimeter may traverse the ground speed scale on said plate.

The drive shaft 31 for the friction cone 30 is connected to some kind of constant speed motor so that it rotates at a constant speed. Obviously, for any given speed of rotation or ground speed the position of the yoke rod 29 along the slot 27 can be taken as a fair indication of the ground speed of the craft at a predetermined height. This principle is utilized in connection with the present invention to position the ground speed plate 38 relative to a predetermined location on the top 34, which is indicated by the pointer 41, suitably secured to the casing 40 in the fore and aft direction of the casing 1.

To effect rotation of the plate 38, a rod 42 extends upwardly from the yoke rod 26 through a slot 43 formed in the top wall 34 parallel with the shaft 20. The slot 43 constitutes a means for steadying the movements of the rod 42 as well as for determining its direction of movement along the plate 34. The upper end of the rod 42 is bent inwardly over the top 34 and is connected to a rack 44 engaging the gear teeth 45 formed on the gear ring 39. It will be evident that as the rod 42 is moved in either direction along the slot 43 by manipulation of the yoke rod 26 it will cause a corresponding rotation of the ground speed indicator plate 38 relative to the fixed pointer 41. This completes the description of the mechanical details of the invention. The mathematical principle of the invention will now be taken up for consideration in connection with Figure 5 of the drawings.

In Figure 5, the line AB represents the image receiving plate 2, and DE the terrain above which the aircraft is supposed to move at the altitude OC. Flight experience indicates that ground speed determinations would be taken at altitudes between 1000 feet and 3000 feet; and at ground speeds varying from 50 to 200 miles per hour. These figures are merely taken for the purpose of illustrating the principle involved and are not to be considered in any way as limits to be imposed on the invention.

Assuming now, that in the operation of the instrument, the lenses 8 swing through an angle $x$ of 5° on each side of the center line OC. Let it be assumed that OE (the distance when the lens starts its backward swing) equals 1000 feet. Then since sin 5°=.08716 and cosine 5°=.99619:

OC=996.19 feet=altitude
CE=87.16 feet=forward travel per half stroke
DE=2CE=174.32 feet forward travel per stroke Therefore $$\frac{5280}{174.32 \times 60} = \frac{30+}{60}$$

strokes per minute per mile per hour.
At 100 miles per hour the number of strokes of the lens will be $$\frac{30+}{60} \times 100 = 50 \text{ per minute.}$$

In the same manner it may be shown that the number of lens strokes per minute at 2000 feet is equal to 25 strokes per minute; and at 3000 feet the number of lens strokes per minute is 16.6 strokes per minute. In other words, the number of lens strokes per minute varies inversely as the altitude.

With this mathematical principle, then, as a basis it becomes necessary to calibrate the ground speed and altitude scales on the instrument itself so that the altimeter pointer may give accurate indications of ground speed on the speed scale at the different heights. In Figure 3 of the drawings, the ground speed scale on plate 38 is shown as starting at the 50 miles per hour graduation and extending by equal divisions around the plate to 150 miles per hour. The altimeter dial, which is fixed relative to the casing top 34 is provided with an altitude scale starting at 1000 feet and extending in equal divisions around the dial to indicate altitudes up to 3000 feet.

In the operation of the device let it be assumed that at an altitude of 1000 feet the ground speed dial is positioned so that the 50 graduation mark is opposite the fixed pointer 41. Let it also be assumed that the altitude is 1000 feet; then, the pointer 37 will indicate a ground speed of 50 miles per hour.

Let it be assumed next that the craft rises to an altitude of 2000 feet and that the ground speed remains unchanged at 50 miles per hour. The rack 44 is moved to the left to reduce the number of lens strokes by one half and thereby operates the gear 45 so as to swing the scale plate 38 through an angle of 180 degrees. At the same time the altimeter pointer swings through the same arc to the altitude indication 2000 and gives an indication of 50 miles per hour on the ground speed scale 38.

If at this height of 2000 feet, the ground speed changed so as to require the same number of lens strokes the instrument had at 1000 feet, the ground speed plate would swing back to its original position with the 50 graduation opposite the pointer 41. The pointer 37, however, would remain at its 2000 feet altitude indication, and would give a ground speed indication of 100 miles per hour on the scale 38. At 3000 feet altitude, and with the same number of lens strokes the pointer will swing through the entire altitude scale to give an indication of 150 miles per hour on the scale 38.

It will be evident that the angular position of the scale 38 relative to the top 34 or pointer 41 is determined wholly by the position of the rack 44 regardless of altitude, and that this position determines the number of lens strokes per minute. The altimeter pointer 37 is the indicator for the ground speed scale. The pointer 41 is merely a convenient reference mark in the initial setting of the instrument on the casing top 34; it has no use whatever as an indicator of ground speed or anything else.

The gearing and cams necessary to secure the equal divisions on the ground speed and altitude scales is not illustrated herein, since these can be readily designed by persons skilled in the art in accordance with the requirements of the instrument. Furthermore, the invention is not to be considered as limited in any way to use with type of friction gearing and lens operating mechanism disclosed herein since a telescope might readily be substituted for the optical arrangement shown, so long as its angular speed is varied to keep the image of the reference object sighted steadily in the field of view.

It is thought that the invention and numerous of its attendant advantages will be understood from the foregoing description and it is obvious that numerous changes may be made in the form, construction and arrangement of the several parts without departing from the spirit or scope of my invention, or sacrificing any of its attendant advantages; the form herein described being a preferred embodiment for the purpose of illustrating my invention.

What I claim is:

1. An aeronautic instrument including a support, a plate rotatable on said support and having a scale of ground speeds formed thereon, said plate being rotatable in accordance with apparent ground speed as of an unknown altitude; and an altimeter having a pointer movable as an indicator along said scale for correcting the ground speed reading for the true altitude.

2. An aeronautic instrument comprising: a casing having an image receiving plate thereon, a lens movable on said casing to project images onto said plate, means for varying the speed of movement of said lens, an altimeter fixed to said casing and including a pointer rotated in accordance with altitude variations, a ground speed scale rotatable concentrically with said pointer and on which said pointer indicates, and mechanism operably connected to said means, for rotating said scale in accordance with variations in lens speed.

3. An aeronautic instrument comprising: a support, a sighting instrument rotatable about a substantially horizontal axis on said support, movable means for varying the speed of rotation of said sighting instrument, a ground speed scale rotatable on said support by and in accordance with the movements of said movable means, and an altimeter fixed on said support and having an indicator reading on said scale.

4. The combination with an aircraft of a sighting device adapted to be mounted on an aircraft to rotate thereon about a substantially vertical axis and having a part thereof rotatable about a normally horizontal axis, adjustable means for varying the rate of rotation of said part to maintain stationary the image of the terrain sighted in the field of view of said device, a plate connected to said means and rotatable thereby in accordance with the ground speed of the aircraft and having a scale of ground speeds formed thereon, a pointer, and altitude responsive means for moving said pointer along said scale in accordance with variations in altitude of said aircraft.

5. The combination with an aircraft of a sighting device adapted to be mounted on an aircraft to rotate thereon about a substantially vertical axis, and having a part thereof rotatable about a normally horizontal axis, and mechanism adjustable to hold said device trained on any object on the earth below, an altimeter including a movable pointer, and a scale member movable by said mechanism relative to said pointer to indicate the ground speed of said aircraft relative to said object.

NORMAN B. HALL.